(12) United States Patent
Nonnenmann et al.

(10) Patent No.: US 10,570,804 B2
(45) Date of Patent: Feb. 25, 2020

(54) ROTARY REGULATOR WITH CONCOMITANTLY MOVABLE FORCE STORE

(71) Applicant: Dr. Ing. h.c. F. Porsche Aktiengesellschaft, Stuttgart (DE)

(72) Inventors: Joerg Nonnenmann, Althengstett (DE); Wolfgang Eberle, Moensheim (DE); Thomas Geffert, Freiberg am Neckar (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 88 days.

(21) Appl. No.: 15/666,735

(22) Filed: Aug. 2, 2017

(65) Prior Publication Data
US 2018/0038266 A1 Feb. 8, 2018

(30) Foreign Application Priority Data
Aug. 4, 2016 (DE) .......................... 10 2016 114 492

(51) Int. Cl.
*F16K 31/06* (2006.01)
*F01P 7/14* (2006.01)
(Continued)

(52) U.S. Cl.
CPC .................. *F01P 7/14* (2013.01); *F01P 7/16* (2013.01); *F16K 31/043* (2013.01);
(Continued)

(58) Field of Classification Search
CPC .. F01P 7/14; F01P 7/00; F01P 2031/00; F01P 2007/146; F01P 7/16; F16K 31/043; F16K 31/047; F16K 31/0675; F16K 31/44; G05G 1/00; G05G 15/00; G05G 23/00; G05G 5/05

USPC .................... 251/89, 66–71, 74–76
See application file for complete search history.

(56) References Cited

U.S. PATENT DOCUMENTS 2,904,956 A * 9/1959 Zenor .................... F16K 31/05
185/40 R
3,606,980 A * 9/1971 Simpson et al. ........ F16K 1/221
251/305
(Continued)

FOREIGN PATENT DOCUMENTS

DE 102 43 778 3/2004
DE 10 2008 030 769 1/2010
(Continued)

OTHER PUBLICATIONS

German Search Report dated May 4, 2017.
Notice of Reason for Rejection dated Jun. 22, 2018.

*Primary Examiner* — John Bastianelli
(74) *Attorney, Agent, or Firm* — Gerald E. Hespos; Michael J. Porco; Matthew T. Hespos

(57) ABSTRACT

A regulator has a regulation unit (422, 622) with an adjustment unit (624), having a drive unit (414, 620) configured for adjusting the adjustment unit (624), and having a lockable and unlockable force store (412, 610-616). The regulation unit (422, 622) and the adjustment unit (624) are in contact with one another via the force store (412, 610-616), and the regulation unit (422, 622) can, in the case of a locked and charged force store (412, 610-616), be displaced by the adjustment unit (624) within an adjustment range (630) so as to drive the force store (412, 610-616). In the event of unlocking the charged force store (412, 610), a discharge of the force store (412, 610-616) causes the regulation unit (422, 622) to be moved automatically into a safety position independently of the adjustment unit (624).

15 Claims, 13 Drawing Sheets

(51) Int. Cl.
*F16K 31/04* (2006.01)
*F16K 31/44* (2006.01)
*F01P 7/16* (2006.01)
*G05G 5/05* (2006.01)
*G05G 15/00* (2006.01)
*G05G 23/00* (2006.01)

(52) U.S. Cl.
CPC ........ *F16K 31/047* (2013.01); *F16K 31/0675* (2013.01); *F16K 31/44* (2013.01); *G05G 5/05* (2013.01); *G05G 15/00* (2013.01); *G05G 23/00* (2013.01); *F01P 2007/146* (2013.01); *F01P 2031/00* (2013.01)

(56) References Cited

U.S. PATENT DOCUMENTS

| | | | | |
|---|---|---|---|---|
| 3,679,852 | A | * | 7/1972 | Himi ................ H01H 3/30 185/40 R |
| 3,808,895 | A | * | 5/1974 | Fitzwater ............... F16K 17/36 185/40 A |
| 4,619,151 | A | * | 10/1986 | Trachman ............. F16H 63/304 185/40 R |
| 2004/0026521 | A1 | | 2/2004 | Colas et al. |
| 2004/0094102 | A1 | | 5/2004 | Bernarding et al. |
| 2006/0238039 | A1 | * | 10/2006 | Niedermeyer ........ F16K 31/047 310/49.01 |
| 2014/0097366 | A1 | | 4/2014 | Klippert et al. |
| 2014/0346380 | A1 | * | 11/2014 | Bourqui ................ F16K 31/041 251/129.11 |

FOREIGN PATENT DOCUMENTS

| | | |
|---|---|---|
| DE | 10 2012 208 652 | 9/2013 |
| DE | 10 2014 204 485 | 2/2015 |
| DE | 10 2013 223 907 | 6/2015 |
| EP | 1 035 307 | 9/2000 |
| EP | 1 085 181 | 3/2001 |
| JP | 2012247008 A | 12/2012 |

\* cited by examiner

ROTARY REGULATOR WITH CONCOMITANTLY MOVABLE FORCE STORE

CROSS REFERENCE TO RELATED APPLICATION

This application claims priority under 35 USC 119 to German Patent Appl. No. 10 2016 114 492.4 filed on Aug. 4, 2016, the entire disclosure of which is incorporated herein by reference.

BACKGROUND

1. Field of the Invention

The invention relates to a regulator and to a method for operating an electronically controlled regulator that exhibits a fail-safe function by means of an unlockable spiral spring that is driven concomitantly in the stressed state.

2. Description of the Related Art

Electronically controlled rotary regulators are used, for example, to regulate a cooling circuit in a vehicle engine. The rotary regulator may comprise a rotary slide that may be connected via a shaft to a valve that controls a coolant throughflow, or that may be capable of directly influencing the coolant throughflow. Control of the coolant throughflow enables the vehicle to be kept at a desired temperature. However, overheating of the vehicle engine resulting from a stoppage of the throughflow of coolant in the event of a fault of the rotary regulator must be ruled out. The rotary regulator must therefore exhibit a fail-safe function to ensure that the rotary slide, in a fault situation, assumes a safety position and ensures the throughflow of coolant. For this purpose, the following solutions are known from the prior art.

DE 102 43 778 A1 describes an electrical actuating device for a valve of an engine cooling circuit of a vehicle where a spring applies a load to a rotary slide. A spring force acts only in a first sliding range of the rotary slide so that, in a second sliding range, the rotary slide can be moved without an opposing force being imparted by the spring.

DE 10 2008 030 769 B4 describes a rotary slide having at least one restoring element. The restoring element is rotatable counter to a spring and can be held by an arresting device. Following release of the arresting device, a concomitant driving means for rotating the rotary slide is provided by the restoring element.

DE 10 2012 208 652 B3 describes a valve for use in coolant flows. The valve has a fail-safe disc with a spring. The fail-safe disc can be arrested in a valve body by a preload of the spring so that, during normal operation, the valve body operates independently of spring forces. In the event of a defect, the connection between the fail-safe disc and the valve housing is released, and the valve body is rotated into an open position by the preload of the spring.

EP 1 085 181 A2 describes an electric valve for a cooling circuit of an engine, wherein an electric motor having a rotor and a stator is provided for rotating the valve. Furthermore, a spring is provided for preloading the rotor and thus the valve relative to an open position.

EP 1 035 307 A1 describes a valve for a cooling circuit, wherein a spiral spring is provided about the valve axis between two pegs. In the event of a defect, one of the pegs is destroyed, and the spring, by means of the restoring force, ensures a rotation of the valve into an open position.

The solutions known from the prior art have the disadvantage that high friction losses arise in the rotary regulator, and high material loading occurs in the event of triggering of the fail-safe function, or the concepts hitherto implemented involve a high weight and/or cost disadvantage. To discuss these disadvantages of the previous solutions in detail, and to be able to thereafter present the advantages of the method according to the invention, some implementations known from the prior art will be illustrated by way of example below on the basis of linear equivalent diagrams.

An approach to implementing the fail-safe function is implemented by a simple restoring spring on the rotary slide. This is illustrated as a linear equivalent diagram in FIG. 1. The disadvantage of this method is that, in a fault situation, a moment of force to be imparted by the restoring spring must be high enough to be able to move the rotary regulator together with a drive on the rotary slide into a safety position. The high moment of force of the restoring spring has to be permanently counteracted in the normal situation. Thus, an electric motor that imparts the drive to the rotary slide must be of very large dimensions. Furthermore, this requires permanent energization of the electric motor.

The concept shown as a linear equivalent diagram in FIG. 2 was developed to move the rotary slide, separated from its drive, into the safety position in a fault situation. An adjustment unit is coupled to the electric motor to displace the rotary slide. The coupling is released in a fault situation, and the restoring spring, which remains fastened to the rotary slide, displaces the rotary slide into the safety position. It is not necessary in this case for a moment of inertia and friction moment of the drive together with electric motor to be overcome. Thus, the moment of force of the restoring spring can be configured to be lower than in the case of the method involved in FIG. 1. However, it is necessary for the restoring spring to be permanently counteracted, and therefore the electric motor must be energized permanently.

The method shown as a linear equivalent diagram in FIG. 3 was developed to eliminate the permanent exertion of load by the restoring spring. The restoring spring is preloaded and locked in an initialization process. In a fault situation, the restoring spring can be unlocked and can act on the rotary slide so that the rotary slide is displaced into the safety position. A disadvantage of this method is that, upon the release of the restoring spring in the fault situation, a very high restoring impulse acts on the loaded rotary slide together with connected drive. A conceivable damper element with cushioning action leads to a relatively high weight and/or cost factor. There is no need in the normal situation for the electric motor to counteract the restoring spring, thus enabling the energization of the electric motor to be reduced. However, the electric motor must be of sufficiently large dimensions to overcome the moment of force of the restoring spring and the friction moment of the rotary slide during the initialization process. This also constitutes a weight and cost factor. Finally, in the case of this concept, it is not possible to resort to a simple implementation of the normal situation by means of a self-locking drive, realized for example by a worm drive, on the rotary slide, because a drive of this type would counteract the high restoring impulse.

It is accordingly an object of the present invention to provide a facility for avoiding high friction losses and high material loading upon triggering of a fail-safe function in a regulator.

SUMMARY

The regulator of the invention comprises at least one regulation unit, an adjustment unit, a drive unit which is configured for adjusting the adjustment unit, and a lockable and unlockable force store. The regulation unit and the adjustment unit are in indirect contact with one another via the force store. The regulation unit can, in the case of a locked and charged force store, be displaced by means of the adjustment unit within an adjustment range so as to concomitantly drive the force store. In the event of unlocking of the charged force store, a discharge of the force store which at least partially occurs here causes the regulation unit to be automatically moved into a safety position independently of the adjustment unit.

In one possible refinement, the force store is a spring, in particular a spiral spring. Here, a charged force store then corresponds to a prestressed spring or a prestressed spiral spring. In the context of the present disclosure, the expressions "spring" and "restoring spring" are used synonymously for one another. A spiral spring is a particular embodiment of a spring or of a restoring spring.

The expressions "coupling" and "coupler" are hereinafter likewise used synonymously for one another.

In a further refinement, the regulator according to the invention is designed as a rotary regulator, wherein the regulation unit is realized as a rotary slide.

In a further embodiment of the regulator according to the invention, the drive unit is furthermore configured to charge the force store, that is to say, in the case of a spring, to correspondingly prestress said spring.

In one possible refinement, the drive unit is a self-locking drive, in particular a worm drive.

In a further refinement, the drive unit comprises an electric motor.

Here, locking and unlocking of the force store is realized by means of an electromagnetic coupling between regulation unit and adjustment unit.

In a further refinement, the regulator according to the invention comprises a locking and unlocking mechanism which is configured to lock the force store as required, and in particular to automatically unlock the force store in a fault situation. Said locking and unlocking mechanism is, in one refinement, realized by means of an electromagnetic coupling between regulation unit and adjustment unit.

The coupling of regulation unit, force store and adjustment unit as provided according to the invention has the effect that a force that has to be imparted in order to charge the force store, or if the force store is realized by a spring, in particular a spiral spring, a torque that has to be imparted in order to prestress the spring, can be reduced by almost 50% in relation to the proposals from the prior art as mentioned in the introduction. This is achieved in that the force store required for the fail-safe function is charged in a first step without the regulation unit being moved. If the force store is realized by a spring, in particular a restoring spring, said spring is prestressed in the first step without the regulation unit, for example the rotary slide, being moved. Therefore, it is not necessary for the torque of the spring and the friction moment of the rotary slide to be overcome simultaneously. When the restoring spring has been sufficiently prestressed, that is to say when the force store has been sufficiently charged, the rotary slide and adjustment unit, that is to say regulation unit and adjustment unit, are connected to one another in positively locking and/or non-positively locking fashion. The non-positive locking may be realized in this case by means of an electromagnetic coupling. In this state, the rotary slide, that is to say the regulation unit, can be moved over an entire provided adjustment range. Here, it is merely necessary for a friction moment of the rotary slide, that is to say of the regulation unit, to be overcome. In the event of a fault, that is to say in a fault situation, for example in the event of a failure of the drive unit, the connection between rotary slide, that is to say between regulation unit, and adjustment unit is released, that is to say the force store is unlocked. Here, the force store is at least partially discharged, that is to say energy is released. Owing to the connection between rotary slide, that is to say between regulation unit, and spring, that is to say force store, the energy that is released is transmitted to the rotary slide, that is to say the regulation unit, by means of a restoring moment or torque, which acts on the rotary slide, of the spring. As a result, the rotary slide, that is to say the regulation unit, moves into a safety position, that is to say generally back into an initial position.

Here, the torques to be overcome are not added together, but rather are divided into preload moment and regulation moment.

Owing to the elimination, according to the invention, of direct contact of rotary slide, that is to say regulation unit, and adjustment unit, use may be made of a self-locking drive, for example a worm drive. This has the advantage that, by means of the adjustment unit, defined positions can be assumed which, during operation, do not change as a result of vibrations or, in the case of use in a coolant circuit, as a result of changing water pressures. A degree of opening of the rotary slide, that is to say of the regulation unit, in the regulation range can accordingly be influenced only by means of the adjustment unit. Here, the fail-safe function is ensured.

By means of the direct connection provided according to the invention between rotary slide, that is to say regulation unit, and spring, that is to say force store, it is the case in a fault situation that the respective components are acted on by a considerably lower impulse than in the approaches to a solution known from the prior art. Upon an unlocking of the force store, that is to say upon the release of the spring in the case of a spring as force store, the rotary slide, that is to say the regulation unit, acts as a damping element, such that the impulse on the other components is relatively low.

In the case of the rotary regulator according to the invention being used in a coolant circuit of a vehicle, it is possible, using a self-locking drive, for the rotary slide to be moved back into its initial position when the vehicle is shut down, and it is not necessary for the restoring spring to be prestressed again upon a restart of the vehicle. The prestress is maintained. It is merely necessary for a connection between rotary slide and adjustment unit to be produced by means of the prestressed spring.

The present invention furthermore relates to a method for operating an electronically controlled regulator having a regulation unit which is adjustable by means of an electronically driven adjustment unit, in which method a fail-safe function is realized by means of a lockable and unlockable force store which, in normal operation, in a charged and locked state, produces operative contact between adjustment unit and regulation unit and is driven concomitantly with the regulation unit during adjustment of the regulation unit and which, in a fault situation, is unlocked and thereby at least partially discharged, whereby the regulation unit is automatically moved into a safety position independently of the adjustment unit.

In one possible refinement of the method according to the invention, the force store is formed by a spring, in particular a spiral spring.

In a further refinement, the regulator is selected to be a rotary regulator with a rotary slide as regulation unit.

It is furthermore conceivable for exertion of load on the adjustment unit and charging of the force store to be realized by means of an electromagnetic drive which comprises an electric motor.

Both the method according to the invention and the regulator according to the invention may be used not only for coolant regulation, in particular in a vehicle, but also for other uses, for example in an actuating element with a required fail-safe facility, either in a linear arrangement or in a rotary arrangement.

Further advantages and refinements of the invention will emerge from the description and from the appended drawings.

It is self-evident that the features mentioned above and the features yet to be discussed below may be used not only in the respectively specified combination but also in other combinations or individually without departing from the scope of the present invention.

SUMMARY

Figure 1:
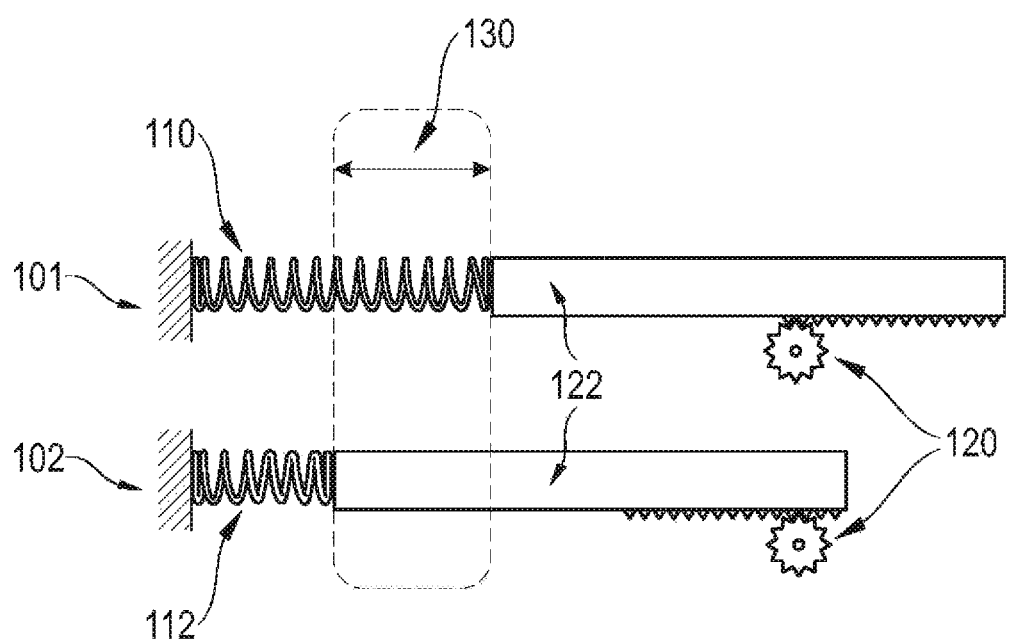
FIGS. 1 to 3 show exemplary linear equivalent diagrams for solutions known from the prior art for a rotary regulator which has a fail-safe function, that is to say which assumes a safety position in the event of a fault.

FIG. 1 shows two operating states 101, 102, that is to say an initial position 101 and a normal situation 102, of a rotary regulator which has a rotary slide 122 which is or can be displaced within an adjustment range 130 by means of a drive 120. A fail-safe function is implemented by means of a simple restoring spring 110, 112. With the restoring spring 110 in a relaxed state, the initial position 101 is formed, which also represents the safety position in which a coolant throughflow is ensured. The rotary slide 122 leaves the entire adjustment range 130 free. In the normal situation 102, the rotary slide 122 has been displaced to a point of complete closure of the adjustment range 130. In a fault situation, which could be caused for example by a failure of the drive 120, the stressed restoring spring 112 moves the rotary slide 122 into the initial position 101 again, but for this purpose, said restoring spring must exhibit a high moment of force, because the entire rotary regulator with rotary slide 122 and with the drive 120 meshing with the rotary slide 122 has to be moved. Since said high moment of force of the restoring spring 112 has to be permanently counteracted by the drive 120 in the normal situation 102, an electric motor which exerts load on the drive 120 must be of very large dimensions. Furthermore, this requires permanent energization of the electric motor.

Figure 2:
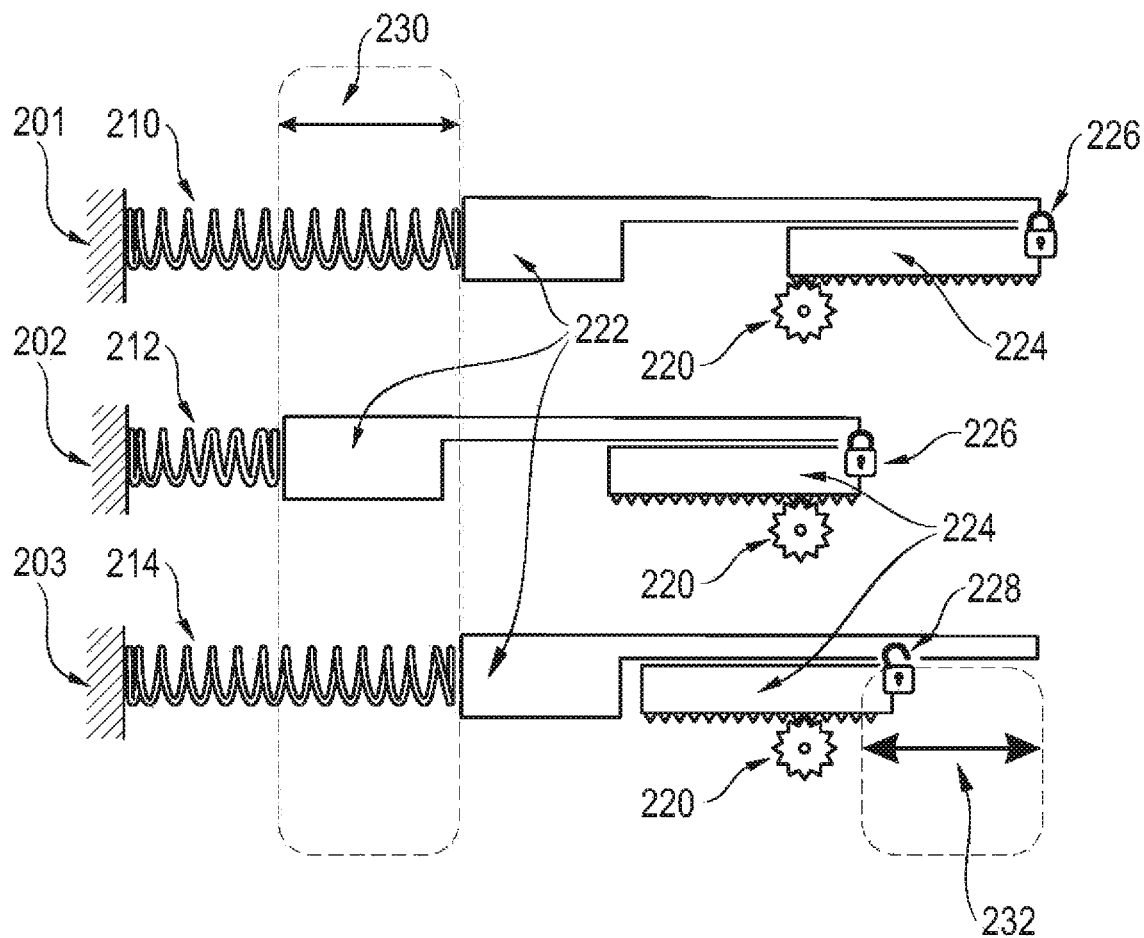

FIG. 2 shows a possibility for moving the rotary slide, separated from its drive, into the safety position in a fault situation. A drive 220 displaces the rotary slide 222 via an adjustment unit 224, which are connected to one another by means of a locked coupling 226. In an initial position 201, the rotary slide 222 leaves an entire adjustment range 230 free. Here, the restoring spring 210 is in the relaxed state. In the normal situation 202, the rotary slide 222 is displaced within the adjustment range 230 to a point at which the restoring spring 212 is stressed to a maximum extent. If a fault situation 203 arises, the coupling is released, as indicated by reference designation 228, and the restoring spring 214 which is fastened to the rotary slide and which relaxes owing to the released coupling displaces said rotary slide into a so-called "fail-safe" range 232. Since it is not necessary in this case for a moment of inertia and friction moment of the drive 220 and of the electric motor which exerts load thereon to be overcome, the moment of force of the restoring spring can be configured to be lower than in the case of the method described on the basis of FIG. 1. However, it is necessary in this case too for the restoring spring to be permanently counteracted, and therefore the electric motor must be permanently energized.

Figure 3:
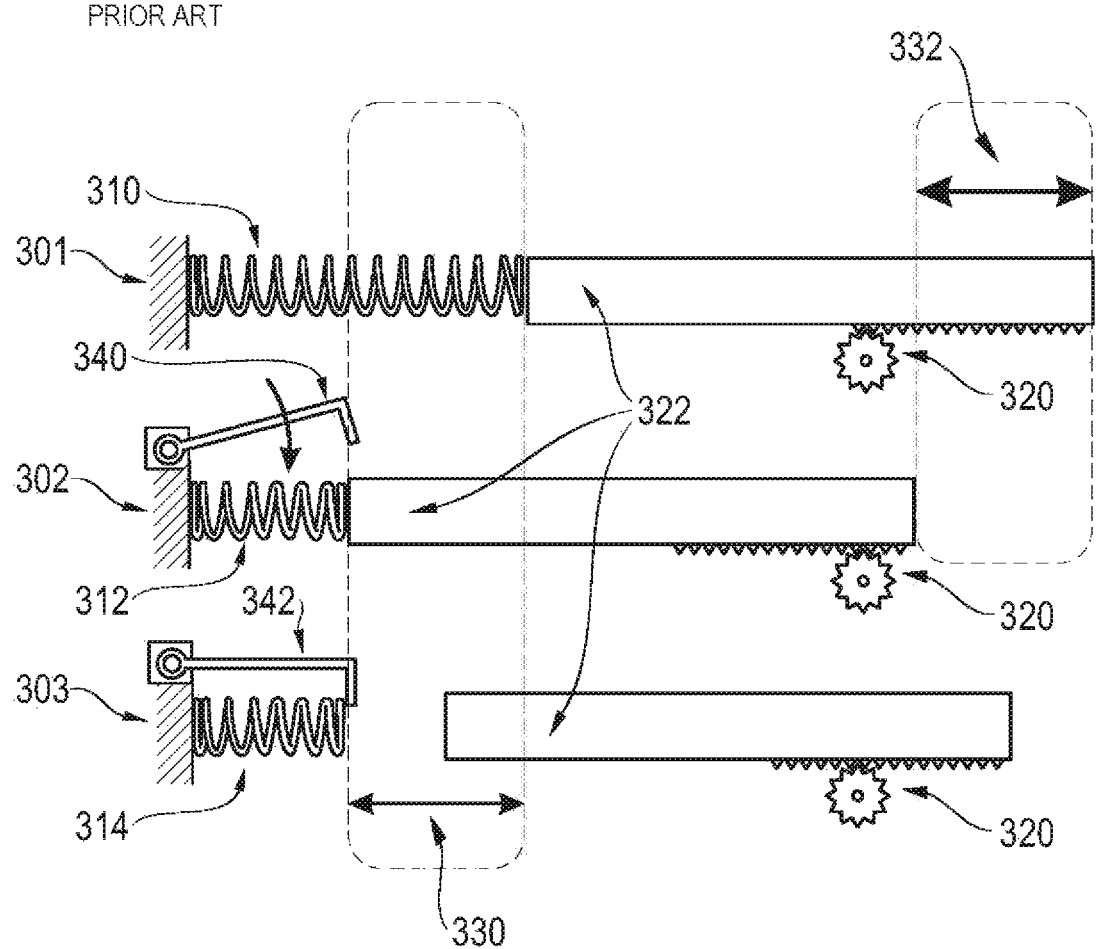

The method illustrated in FIG. 3 avoids permanent exertion of load by means of a restoring spring 310. During an initialization process 301, 302, the rotary slide 322 is displaced by the drive 320 from the initial position 301 through a prestress range 332. The initially relaxed restoring spring 310 is hereby placed into a stressed state 312, and is held in said stressed state by means of a locking process 302 by means of a latch 340 which pivots down, as indicated by a curved arrow. Now, in the normal situation 303, the rotary slide 322 can be displaced within the adjustment range 330 without exertion of load by the restoring spring 314, which is held by the engaged latch 342. In a fault situation, the restoring spring 314 can be unlocked and can act on the rotary slide 322 such that the latter is displaced into the safety position, which corresponds to the initial position 301. A disadvantage of said method is that, upon the release of the restoring spring in the fault situation, a very high restoring impulse acts on the loaded rotary slide 322 together with connected drive 320.

The reference designations will hereinafter generally relate to the respective figure. Accordingly, even identical components will, in part, be provided with correspondingly different reference designations. In the context, it will however become clear that the figure description is also to be understood as encompassing all of the figures.

Figure 4:
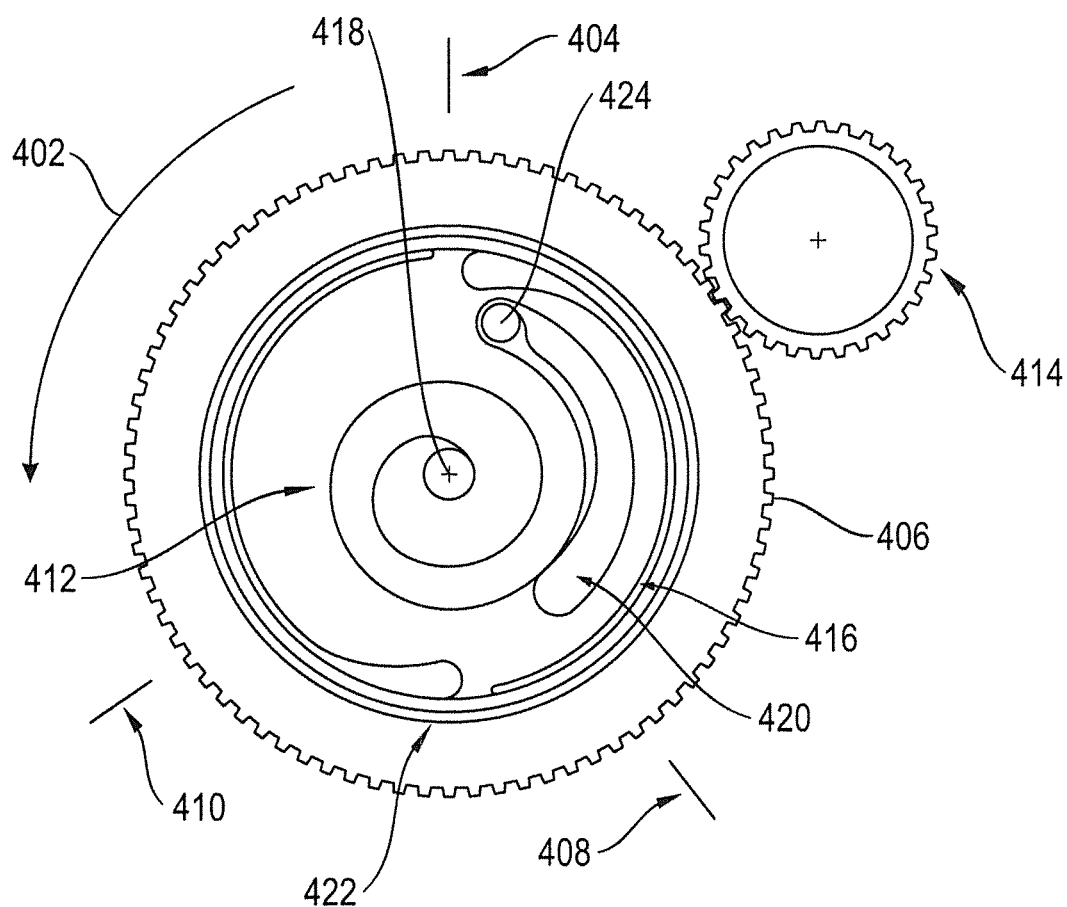
FIGS. 4 and 5 are plan views that show the functional principle of an embodiment of the rotary regulator according to the invention.

FIG. 4 schematically shows, in a plan view, a rotary regulator which can realize an embodiment of the method according to the invention. A rotary slide 422 forms, with an outer spring holder 424, a first assembly "rotary slide", and is, in a manner not visible in this illustration, flange-mounted on a valve for controlling a coolant throughflow. The valve is open to the maximum extent when the outer spring holder 424 is situated in a position 404, whereas said valve is closed when the rotary slide 422 is rotated clockwise through an angle of 135 degrees into the position 408. The adjustment range is situated between said two positions 404 and 408. For the prestressing of a restoring spring 412 in the form of a spiral spring, which serves in this case as force store, a brake body 406 which contains a coil runs through a prestress range 402 between the safety position 404, which signifies a maximum coolant throughflow, and a locking position 410, in which said brake body is rotated counterclockwise through an angle of likewise 135 degrees. The brake body 406 is subjected to load by a drive 414. When the brake body 406 is situated in the locking position 410, an electromagnetic field which is generated by energization of the coil contained in the brake body 406 acts on the latch 416 formed as a brake and deflects said latch such that the brake is locked with the rotary slide 422. The brake body 406, the latch 416 formed as a brake, a rotary shaft 418 formed as an inner spring holder, and an opening 420 form a second assembly "adjustment unit/latch". By means of the locking action, the drive 414 now acts on the first assembly "rotary slide" together with the second assembly "adjustment unit/latch". An opening angle of 135 degrees selected in the illustration serves merely for illustration of the method according to the invention. In general, other opening angles, such as for example 90 degrees or 180 degrees, are also conceivable, but are coupled to the adjustment range between closure and maximum opening that is defined by the valve positions.

Figure 5:
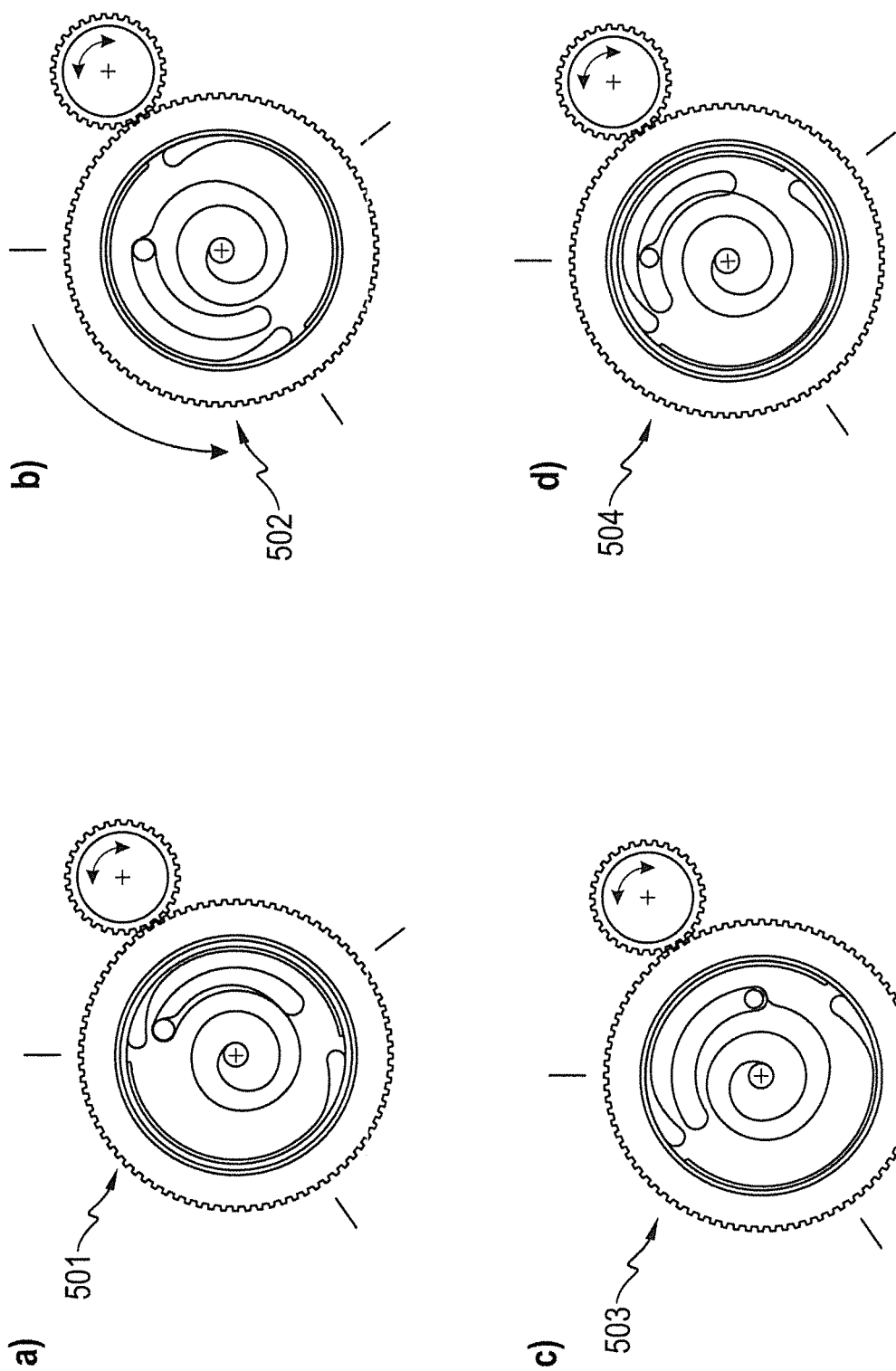

FIG. 5 shows the different operating states of the rotary regulator illustrated in FIG. 4 in detail. In the initial position 501, the first assembly "rotary slide" is not locked to the second assembly "adjustment unit/latch". The outer spring holder 424 is situated at a left-hand abutment point of the opening 420. In the image 502, for the prestressing of the restoring spring 412, the second assembly "adjustment unit/latch" is rotated 135 degrees counterclockwise into the locking position 410 by the drive 414. The outer spring holder 424 is now situated at a right-hand abutment point of the opening 420. For the locking action, an electromagnetic field which is generated by energization of the coil contained in the brake body 406 acts on the latch 416 formed as a brake and deflects said latch such that the brake is locked flush with the rotary slide 422. The two locked-together assemblies "rotary slide" and "adjustment unit/latch" are now jointly subjected to load by the drive 414. Throughout the normal situation 503, the electromagnetic field generated by the coil, and thus the locking action, are maintained. The two assemblies are subjected to load by the drive 414 such that the outer spring holder situated in the assembly "rotary slide" is situated within the adjustment range between the positions 404, corresponding to maximum valve opening, and 408, corresponding to valve closure. In the fault situation 504, the fail-safe function of the method according to the invention is triggered. The energization of the coil which generates the electromagnetic field is deactivated, whereby the latch 416 formed as a brake is released from the rotary slide 422, whereby the two assemblies "rotary slide" and "adjustment unit/latch" can rotate separately from one another. Since the second assembly "adjustment unit/latch" is subjected to load by the drive, which in the fault situation is inactive, the prestressed restoring spring 412 discharges by deflecting the outer spring holder 424, whereby the first assembly "rotary slide" is moved into the position 404, which corresponds to maximum valve opening and which, in the fault situation, constitutes the safety position. A further counterclockwise displacement of the assembly "rotary slide" permitted by the opening 420 is prevented through the limitation of the adjustment range.

Figure 6:
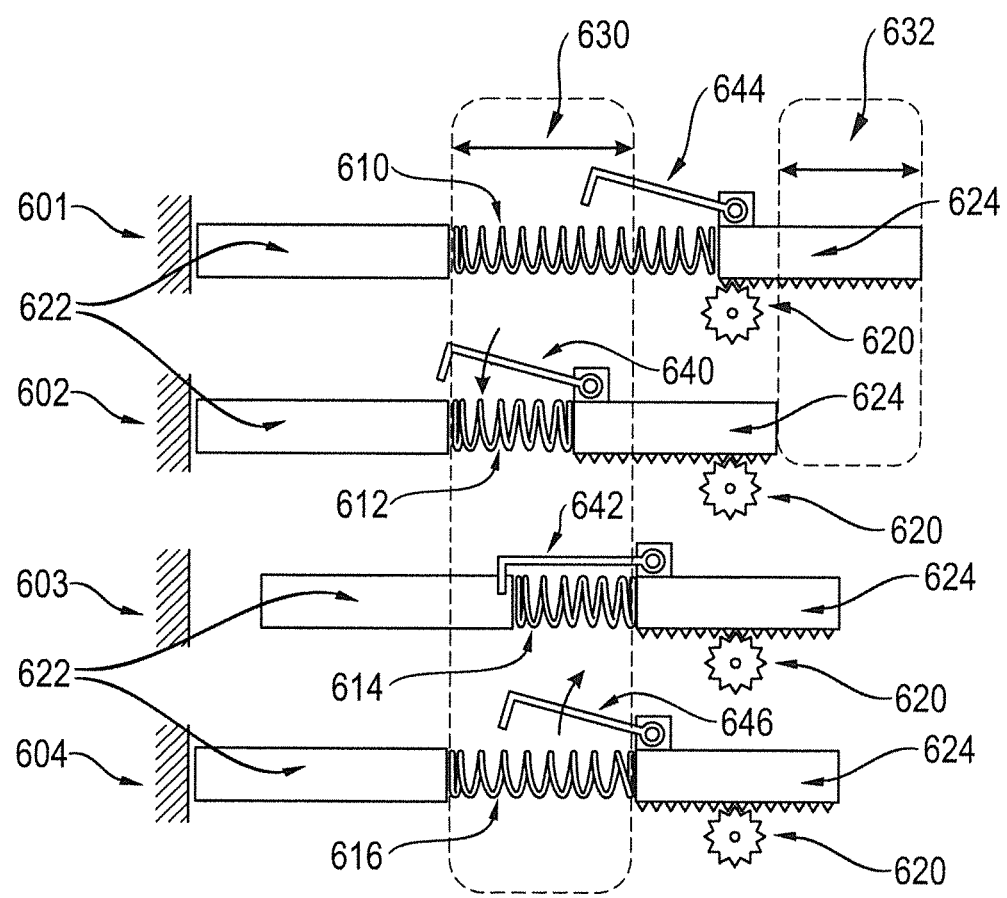
FIG. 6 is the linear equivalent diagram associated with FIGS. 4 and 5.

In FIG. 6, the operating states from FIG. 5 are illustrated in a linear equivalent diagram. In the initial position 601, the rotary slide 622 leaves the entire adjustment range 630 free, which corresponds to a maximum coolant flow. An open latch 644 is situated on an adjustment unit 624, which is subjected to load by a drive 620, or on the rotary slide 622. The rotary slide 622 and adjustment unit 624 are connected to one another by means of a restoring spring 610. Depending on the position of the restoring spring, said restoring spring will hereinafter, in the context of FIG. 6, be denoted using the reference designations 610 (initial position—relaxed state), 612 (prestressed state), 614 (prestressed and locked state) and 616 (unlocked and relaxing state). For the prestressing action 602, the drive 620 displaces the adjustment unit 624 toward the rotary slide 622 within a prestress range 632, and in so doing stresses the restoring spring 612. The latch 640 now pivots downward and locks the rotary slide 622 to the adjustment unit 624. In the normal situation 603, the drive 620 exerts load on the assembly composed of rotary slide 622, stressed restoring spring 614, closed latch 642 and adjustment unit 624 as a common unit, and displaces said unit within the adjustment range 630. In the fault situation 604, the fail-safe function takes effect, and the latch 646 opens. Owing to the inertia or an end stop of the drive meshing with the adjustment unit 620, the relaxing restoring spring 616 discharges with action on the rotary slide 622 and moves the latter back into the initial position, which corresponds to the safety position with maximum coolant flow.

Figure 7:
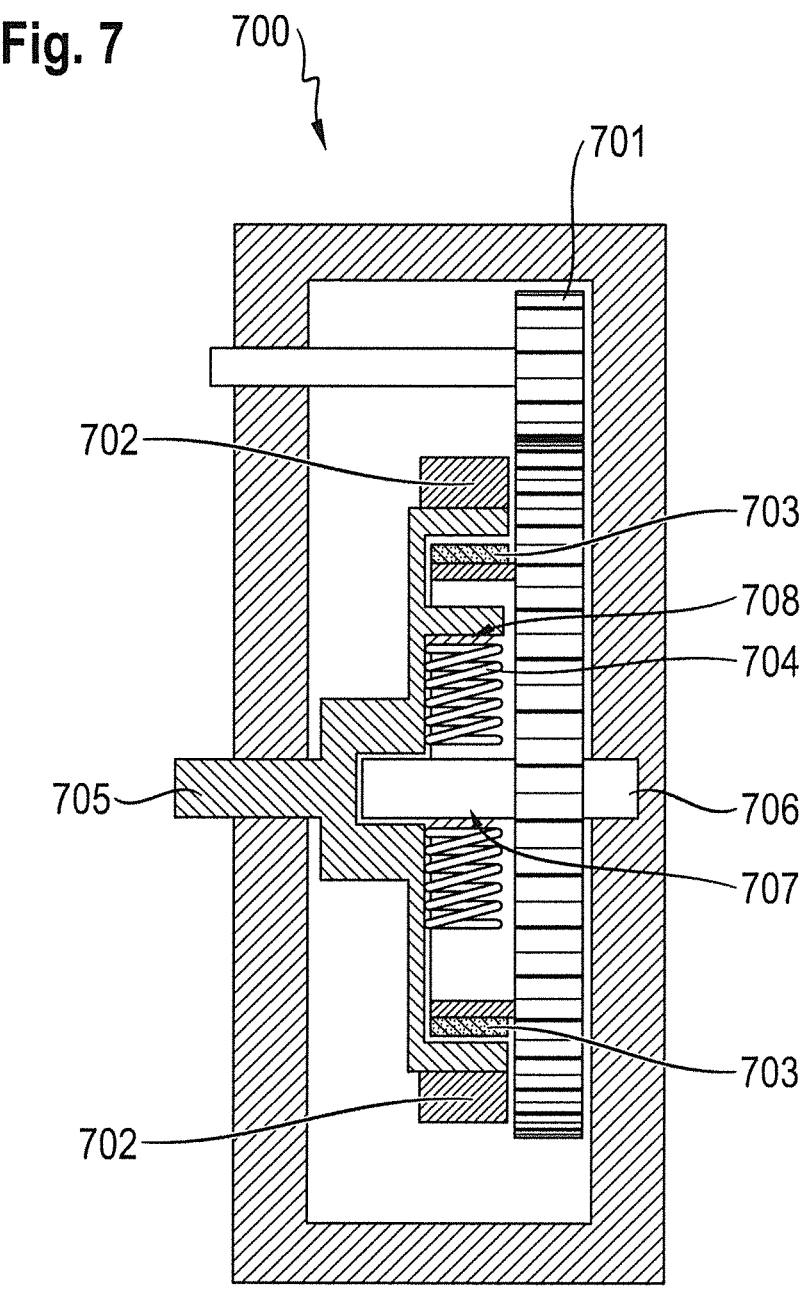
FIGS. 7 and 8 illustrate further embodiments of the rotary regulator according to the invention in a respective sectional diagram.

FIG. 7 schematically shows a sectional image of a possible first design of a rotary regulator 700 according to the invention for carrying out an embodiment of the method according to the invention. A drive 701 exerts load on the brake body 706, which concomitantly drives a latch formed as a brake 703. Furthermore, on the brake body 706, there is provided a rotary shaft 707 formed as an inner spring holder. In this design state, a coil 702 is situated on a rotary slide 705, the electromagnetic field of which coil can bring the brakes 703 into contact with the rotary slide 705. Furthermore, said rotary slide comprises an outer spring holder 708 for a restoring spring 704, in particular a spiral spring or leg spring.

Figure 8:
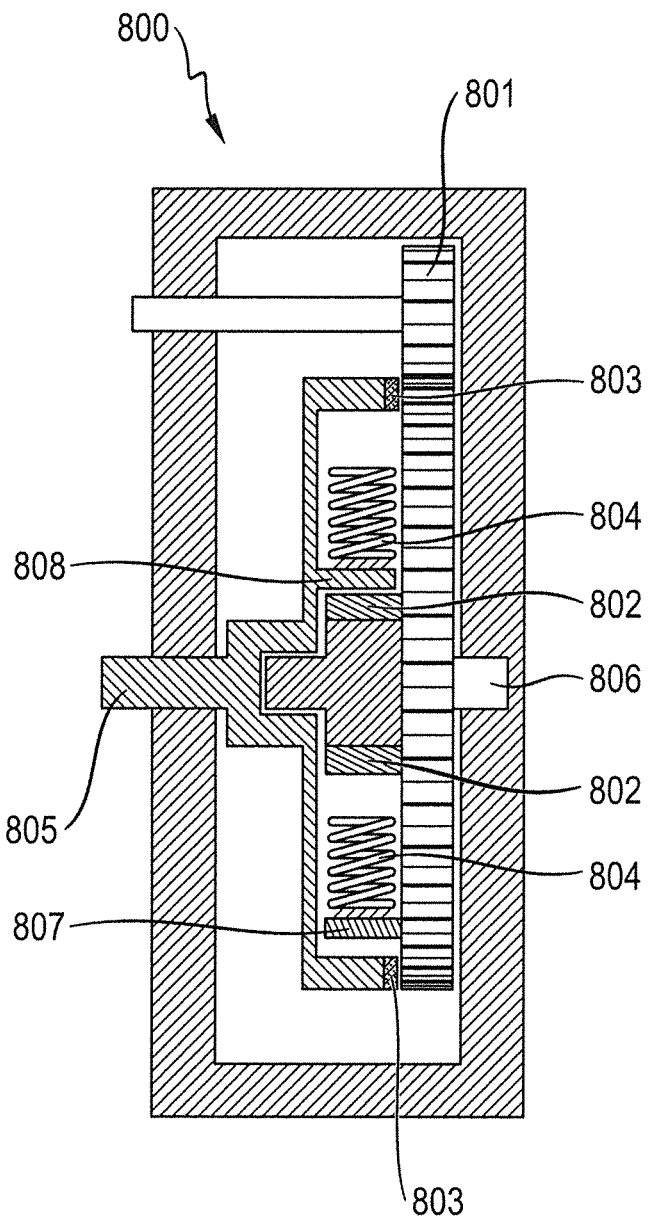

FIG. 8 schematically shows a sectional image of a possible second design of a rotary regulator 800 according to the invention for carrying out an embodiment of the method according to the invention. A drive 801 exerts load on a brake body 806, on which, in this design state, there is situated a coil 802. The electromagnetic field of said coil is configured so as to exert an attracting action on a rotary slide 805 in a direction toward the brake body 806. A brake lining may be provided at contact points 803. A restoring spring 804, in particular a spiral spring or leg spring, is anchored by means of a spring holder 807 on the brake body and by means of a spring holder 808 on the rotary slide.

Figure 9:
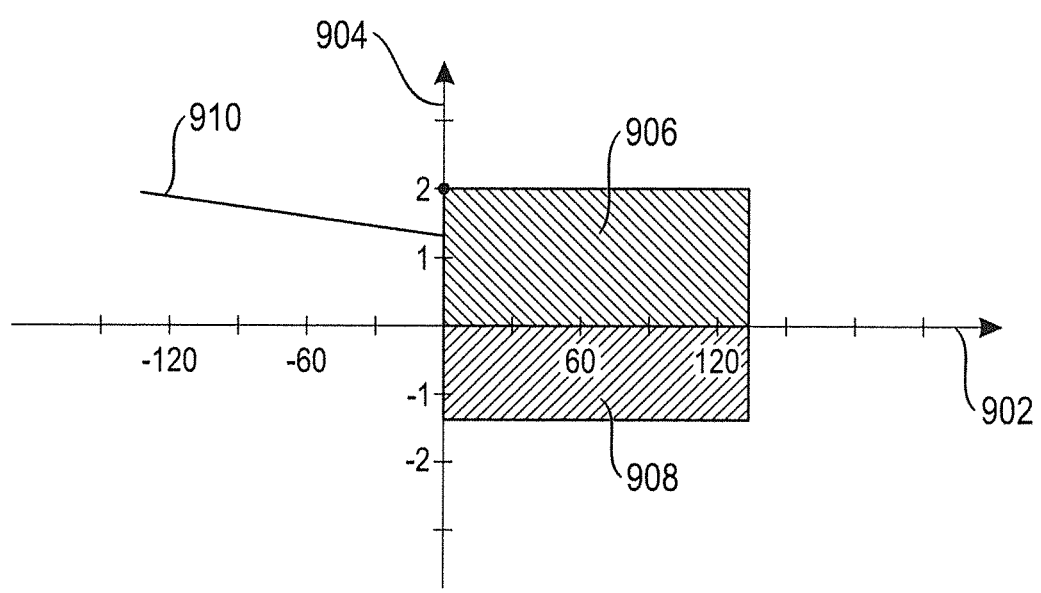
FIGS. 9 and 10 are characteristic curves of an embodiment of the method according to the invention, also in comparison with methods known from the prior art, for a torque as a function of an adjustment angle.

FIG. 9 shows ranges of torques 904 arising during the execution of an embodiment of the method according to the invention as a function of an adjustment angle 902. Accordingly, the torque 904 is plotted on the ordinate, and the adjustment angle 902 is plotted on the abscissa. During the prestressing in the angle range between 0 and −135 degrees, a spring characteristic curve 910 of a restoring spring that is to be provided as force store is followed. In the normal situation, only the friction forces of the coupled assemblies "rotary slide" and "adjustment unit" described on the basis of FIG. 4, which friction forces arise during rotation in the angle range between 0 degrees and 135 degrees, have to be expended. In the embodiment of FIG. 4, this comprises a range 908 up to typically 1.4 Nm, shown in the negative section of the torque axis 904. For the restoring moment in the normal range 906, it would be necessary, that is to say without locking of the restoring spring according to the method according to the invention, for the 2 Nm reached in accordance with the spring characteristic curve at −135 degrees to be imparted, specifically in addition to the friction forces 908. Said restoring moment does not arise in the normal situation in the case of the regulator according to the invention, but is imparted by the restoring spring only in a fault situation in order to realize the fail-safe function.

Figure 10:
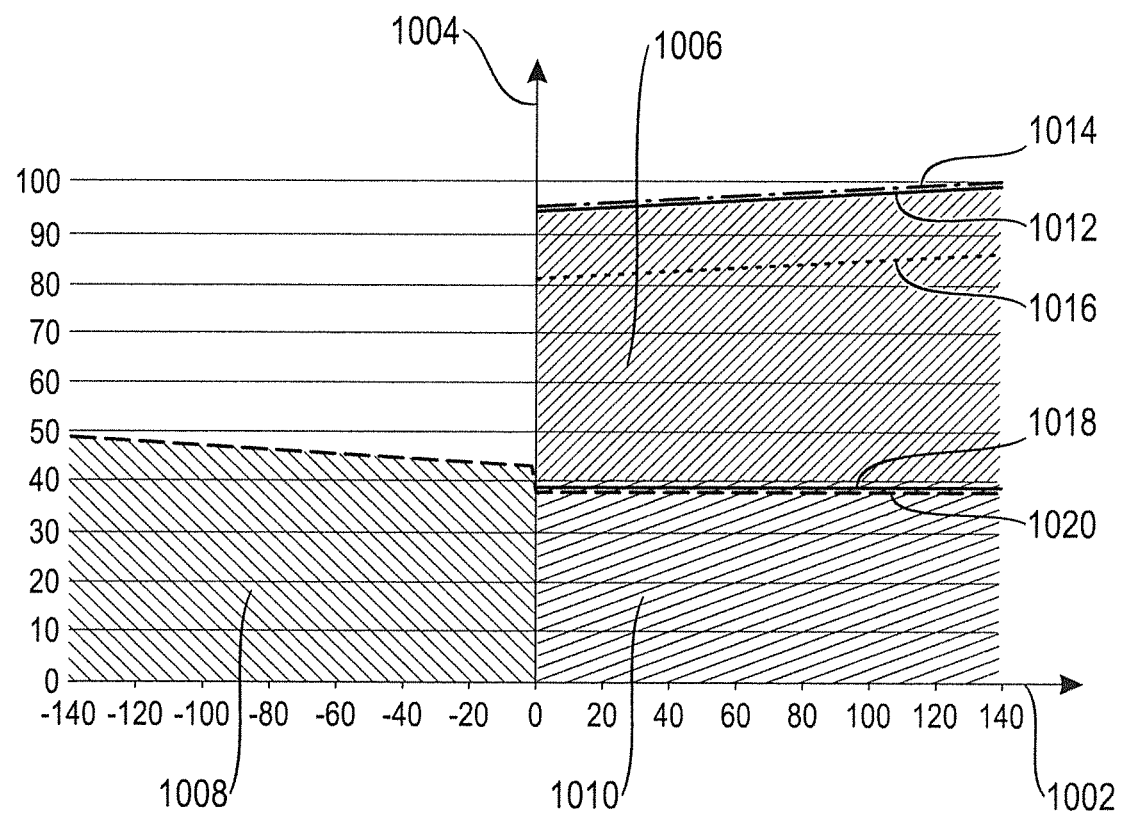

FIG. 10 compares the torques arising in the different concepts from FIGS. 1, 2 and 3 with the regulator according to the invention. On the vertical axis, a so-called nominal torque 1004, normalized with respect to the highest arising torque, is plotted as a function of the adjustment angle in degrees 1002. A drive used in the respective concept must, in order to realize the function, overcome at least the illustrated torque that arises. The torque that arises during the prestressing process in the regulator according to the invention is illustrated in a prestress range 1008. The torques that arise in the normal situation in the case of the regulator according to the invention for overcoming the friction forces 1020 form the working range without exertion of load by the restoring spring 1010, which has quantitatively lower torques than the prestress range 1008. The method 1018 illustrated in FIG. 3 also regulates in the same range 1010 for as long as the restoring spring is locked. However, the method from FIG. 3 requires a much higher torque 1014 for the prestressing of the restoring spring, which also corresponds to the method 1012 from FIG. 1, in which said high torque has to be counteracted even in the normal situation. Therefore, in this case, there is a range 1006 which, in addition to the range 1010, forms a torque that must be provided by the drive. In quantitative terms the method from FIG. 2 requires a somewhat lower torque to be overcome by the drive, in which method, in the event of a fault, the inertia and friction moments of the drive or of the adjustment unit do not have to be overcome, and therefore the restoring spring is configured with a lower moment of force, counter to which a relatively low torque 1016 then has to be imparted in the normal situation.

Figure 11A:
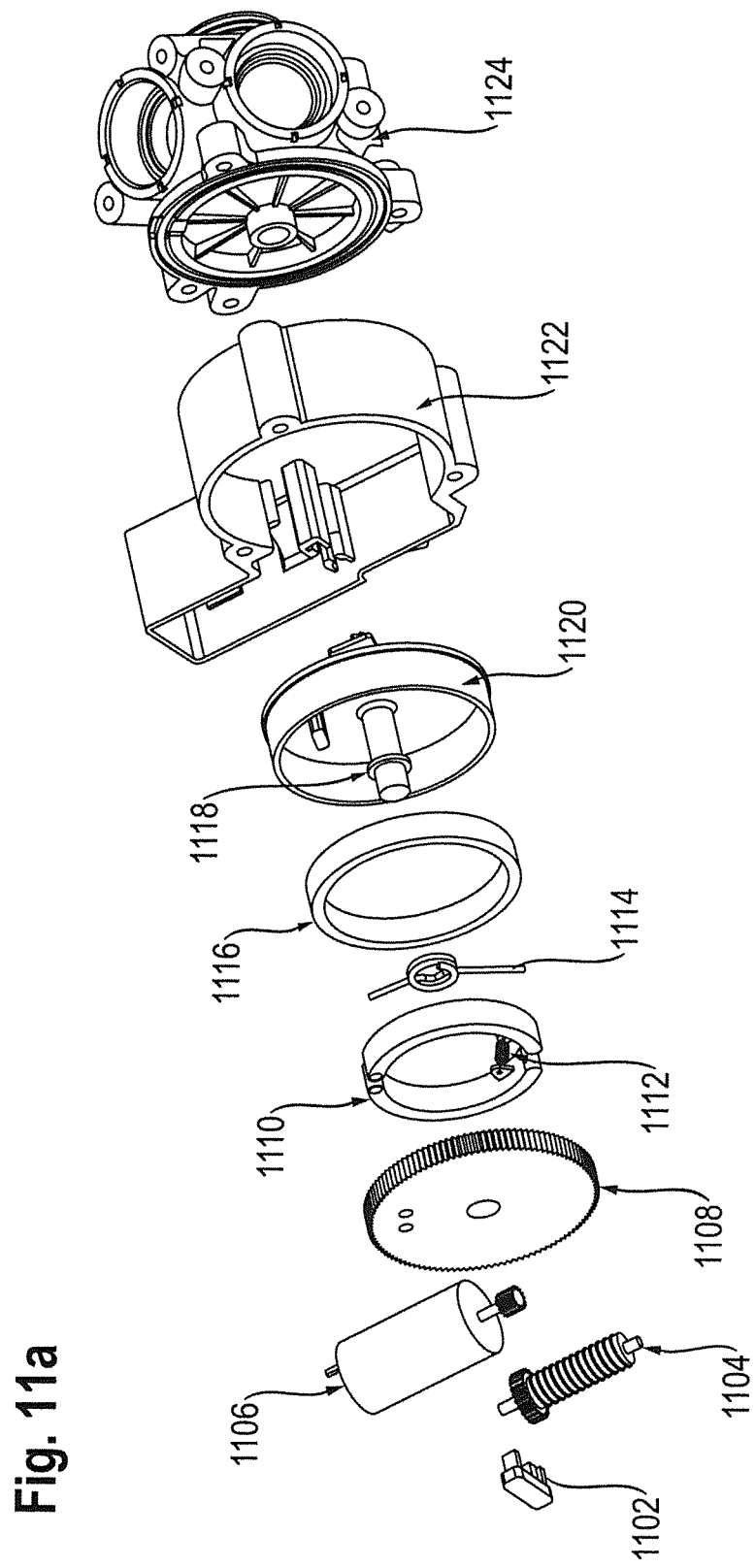
FIGS. 11a, 11b and 11c, are examples of a possible implementation of a design for an embodiment of the rotary regulator according to the invention which can carry out an embodiment of the method according to the invention.
Figure 11B:
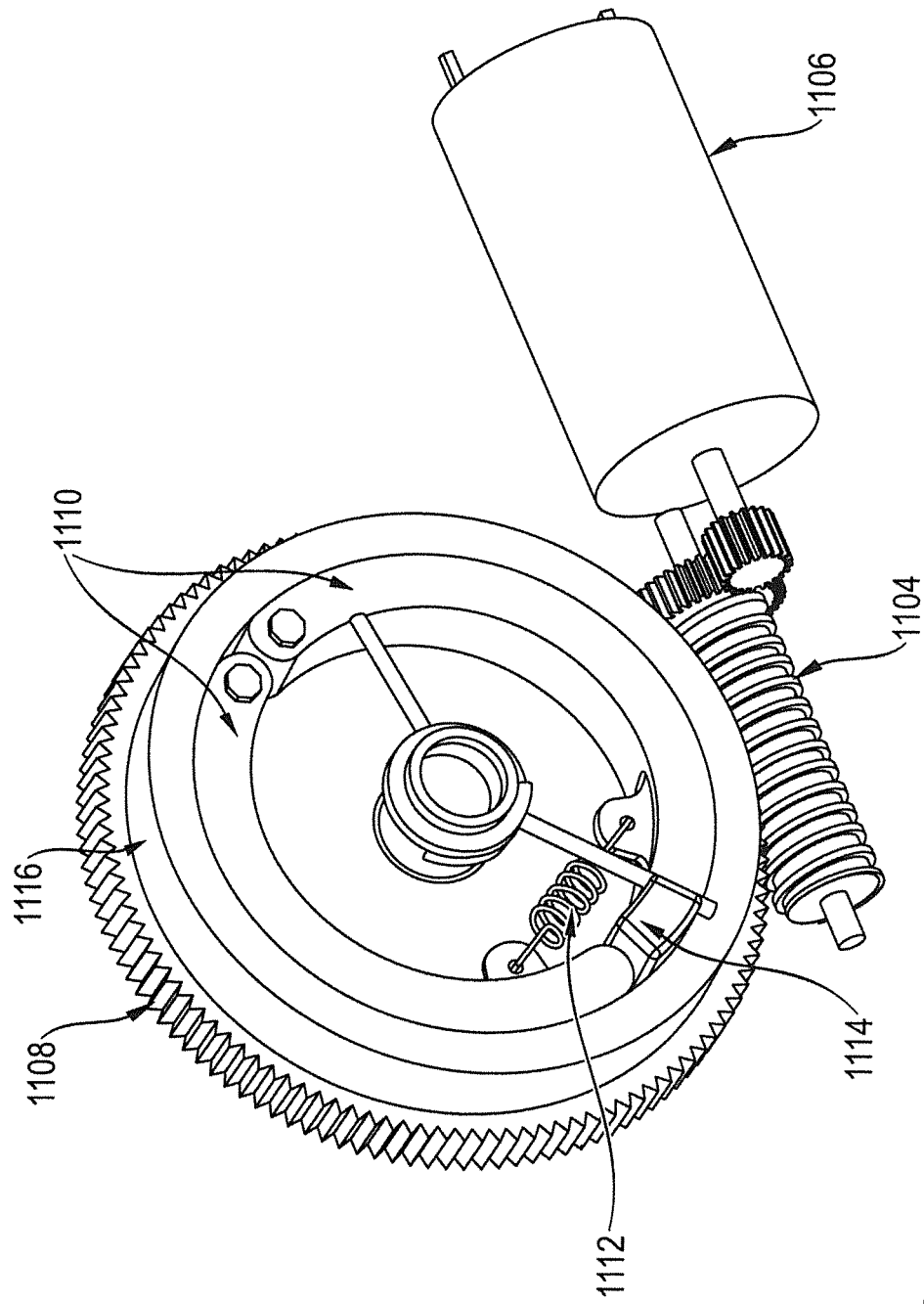
Figure 11C:
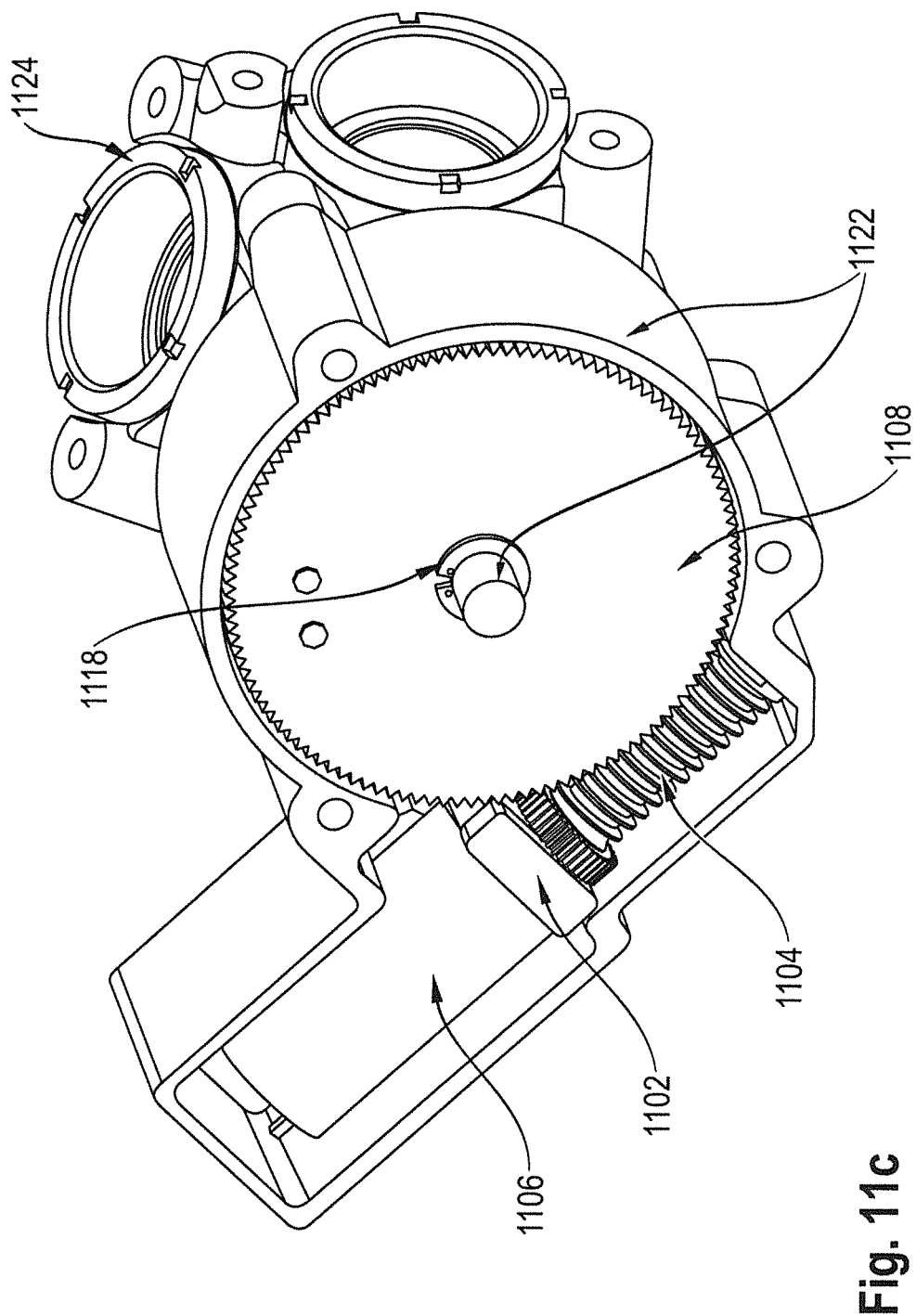

FIG. 11 shows a possible implementation of a design for an embodiment of the rotary regulator according to the invention which can carry out an embodiment of the method according to the invention. FIG. 11a illustrates this as an exploded drawing, which comprises a worm gear holder 1102, a worm gear 1104, a motor 1106, a brake body 1108, brake pads 1110, a brake spring 1112, a restoring spring 1114, a magnet 1116, a magnet body 1120 with a securing ring 1118, a motor housing 1122 and a Z valve 1124. FIG. 11b shows a partially assembled state of the drive and the adjustment unit together with the regulation unit. This is shown in an inserted state in the motor housing in FIG. 11c.

What is claimed is:

1. A method for operating an electronically controlled regulator having a movable regulation unit; an adjustment unit that is movable independently of the regulating unit, a drive device for selectively moving the adjustment unit and a lockable and unlockable force store mounted on the adjustment unit and being selectively lockable to the regulation unit or releasable from the regulation unit, the method comprising:

locking the force store to the regulation unit;
    operating the drive device for simultaneously adjusting a position of the adjustment unit and the regulation unit that is locked by the force store mounted on the adjustment unit; and
    operating the force store to release the regulation unit from the adjustment unit so that the force store causes the regulation unit to be moved automatically into a safety position independently of the adjustment unit.

2. The method of claim 1, wherein the force store is formed by a spring.

3. The method of claim 1, wherein the regulator is a rotary regulator with a rotary slide as regulation unit.

4. The method of claim 1, further comprising operating an electromagnetic drive that has an electric motor for exerting a load on the adjustment unit and charging the force store.

5. The method of claim 4, wherein the drive device is a self-locking drive is used.

6. The method of claim 1, further comprising operating an electromagnetic coupler between the regulation unit and the adjustment unit for locking and unlocking the force store.

7. A regulator having, comprising:
    a movable regulation unit;
    an adjustment unit movable independently of the regulation unit;
    a drive unit coupled to the adjustment unit and being selectively actuable for adjusting a position of the adjustment unit; and
    a lockable and unlockable force store mounted to the adjustment unit and configured for selectively locking the regulation unit to the adjustment unit so that actuation of the drive unit for adjusting the position of the adjustment unit also adjusts a position of the regulation unit within an adjustment range, the force store further being configured for unlocking the regulation unit from the adjusting unit and automatically moving the regulation unit into a safety position independently of the adjustment unit.

8. The regulator of claim 7, wherein the force store is a spiral spring.

9. The regulator of claim 7, wherein the regulator is a rotary regulator, and the regulation unit is a rotary slide.

10. The regulator of claim 7, wherein the drive unit is configured to charge the force store.

11. The regulator of claim 7, wherein the drive unit is a self-locking worm drive.

12. The regulator of claim 7, wherein the drive unit comprises an electric motor.

13. The regulator of claim 12, further comprising an electromagnetic coupling between the regulation unit and the adjustment unit for locking and unlocking of the force store.

14. The regulator of claim 13, wherein the electromagnetic coupling is effected by an electromagnetic field of an energized coil.

15. A valve that is regulable by the regulator of claim 7.

* * * * *